United States Patent [19]

Hergenrother et al.

[11] 4,243,795
[45] Jan. 6, 1981

[54] POLYPHOSPHAZENE COPOLYMERS CONTAINING N-SUBSTITUTED PYRROLE SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 71,900

[22] Filed: Sep. 4, 1979

[51] Int. Cl.³ .............................................. C08G 83/00
[52] U.S. Cl. .................................... 528/168; 528/374; 528/392; 528/399
[58] Field of Search ................ 528/168, 374, 392, 399

[56] References Cited

U.S. PATENT DOCUMENTS

| | | | |
|---|---|---|---|
| 4,179,553 | 12/1979 | Hergenrother et al. | 528/399 |
| 4,179,556 | 12/1979 | Hergenrother et al. | 528/399 |
| 4,182,837 | 1/1980 | Hergenrother et al. | 528/399 |

Primary Examiner—Wilbert J. Briggs, Sr.

[57] ABSTRACT

Polyphosphazene polymers are prepared which contain repeating units represented by the formulas:

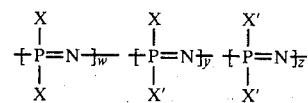

wherein X is the same or a mixture of different radicals represented by the following structural formula:

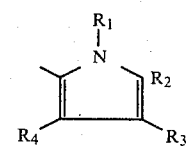

wherein $R_1$ is selected from the group consisting of alkyl and aryl radicals and $R_2$, $R_3$ and $R_4$ are independently selected from the group consisting of hydrogen, alkyl, alkenyl aryl, alkoxy, aryloxy and heterocyclic radical and $R_{1-4}$ can be substituted with one or more substituents which are non-reactive with various materials during polymer formation; and X' can be substituted or unsubstituted and is selected from the group consisting of halogen, alkoxy, aryloxy, amino and mercapto radicals or mixtures thereof; and 20 $(w+y+z)$ 50,000 per polymer.

The polymers of the present invention can be utilized in applications such as molding, coatings, foams, fibers and the like.

9 Claims, No Drawings

POLYPHOSPHAZENE COPOLYMERS CONTAINING N-SUBSTITUTED PYRROLE SUBSTITUENTS

BACKGROUND OF THE INVENTION

Polyphosphazene polymers containing repeating —P=N— units in which various unsubstituted and substituted alkoxy, aryloxy, amino and mercapto groups are attached to the phosphorus atom and their method of preparation are described in the prior art as illustrated in the publication "Phosphorus-Nitrogen Compounds," Academic Press, New York, N.Y. 1972, by H. R. Allcock and "Poly(Organophosphazenes)," Chemtech, Sept. 19, 1975, by H.R. Allcock and in such as U.S. Pat. Nos. 3,515,688; 3,702,833; 3,856,712; 3,974,242 and 4,042,561; which are hereby incorporated by reference.

However, none of the aforementioned publications or for that matter, none of the prior art of which the applicants are aware, discloses or suggests polyphosphazene copolymers containing N-substituted pyrrole substituents attached directly to the phosphorus atom of the polyphosphazene backbone to methods of preparing such polymers.

SUMMARY OF THE INVENTION

This invention relates to polyphosphazene copolymers containing repeating $+P=N+$ units in the polymer chain in which N-substituted pyrrole substituents are attached to the phosphorus atom. More particularly, the invention relates to polyphosphazene copolymers having substituents which are attached to the phosphorus atom and to a method of preparing such copolymers. The copolymers additionally contain other substituent groups, such as a halogen, alkoxy, aryloxy, amino or mercapto groups which are compatible with N-substituted pyrrole substituents and are known in the polyphosphazene state of the art as being capable of being substituted onto the polyphosphazene. These substituents may be substituted onto the polyphosphazene by the method disclosed in the present invention or by prior art methods.

DETAILED DESCRIPTION OF THE INVENTION

The copolymers of the invention contain repeating units represented by the formulas:

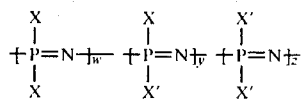

wherein X is represented by:

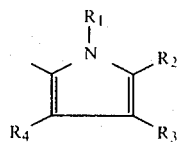

wherein $R_1$ is selected from a group consisting of alkyl and aryl radicals and $R_2$, $R_3$ and $R_4$ are independently selected from the group consisting of hydrogen, alkyl, alkenyl, aryl, alkoxy, aryloxy, and heterocyclic radicals; wherein $R_{1-4}$ can be substituted with one or more substituents which are non-reactive with the various materials present during polymer formation such as alkyl, aryl, chloro, bromo, nitro, cyano, alkoxy, aryloxy and heterocyclic groups and X' can be substituted or unsubstituted halo, alkoxy, aryloxy, amino, or mercapto radicals or a mixture of such radicals which are known in the state of the art of polyphosphazene technology and which are compatible with N-substituted pyrrole substituents.

One skilled in the art readily will also recognize that steric hindrance will dictate the propriety of using relative bulky groups in the positions on the pyrrole ring adjacent to the 5-position since, as set forth hereinafter, the polymers of the present invention are made by reacting the hydrogen in the 5-position adjacent to the nitrogen atom in the pyrrole ring with a chlorine atom on a phosphorus atom in a poly(chlorophosphazene) backbone. Desirably, groups which sterically hinder this reaction should be avoided. With the foregoing in mind, the selection of the various substitution groups which can be present on the pyrrole ring will be apparent to one skilled in the art.

In the polymer units represented by the above formulas, all X substitutent groups can be the same or they can be a mixture of different N-substituted pyrrole substituents and the X' substituent groups can be the same or they can be mixtures of halo, alkoxy, aryloxy, amino and mercapto groups.

When the term polymer is used hereinafter, it will include within its meaning copolymers of substituted polyphosphazenes wherein a copolymer is defined as a polyphosphazene having a N-substituted pyrrole substitutuent and a substituent selected from the group represented by X'.

The phosphazene polymers of the invention can be represented by the formula:

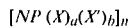

$[NP(X)_a(X')_b]_n$ wherein n is from 20 to 50,000 and $a+b=2$, and a and b are greater than zero.

The specific proportion of X to X' substituent groups incorporated in the copolymers of the invention can vary considerably depending upon chemical and physical properties desired in the copolymer and the particular end use application for which the copolymer is intended. Thus, for applications such as moldings, coatings, foams, fibers and the like, the copolymer should contain at least 10 mole percent by weight and preferably at least 25 mole percent by weight of the N-substituted pyrrole substituent.

Although the N-substituted pyrrole substituent can be substituted with an alkenyl radical for purposes of crosslinking, further crosslinking functionality may be desired. Where the presence of further crosslinking functionality is desired it can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520; 4,061,606; 4,083,824; 4,083,825; and 4,076,658; which are hereby incorporated by reference and include —OCH=CH$_2$ and OR$_3$CF=CF$_2$, as well as similar groups which contain unsaturation. Generally, when present, the moieties containing crosslinking functionality are usually present in an amount between about 0.1 mole percent and to about 50 mole percent and usually between about 0.5 mole percent to about 10 mole percent based on the replaceable chlorine in the starting poly(dichlorophosphazene). These additional cure sites are included within the definition and scope of substituted alkoxy substituents.

The polymers can be used to prepare protective films and can be utilized in applications such as moldings, foams, coatings and the like.

METHOD OF PREPARATION

The polymers are prepared by reacting a poly(dichlorophosphazene) having the formula $\pm NPCl_2\pm_n$—in which n is from 20 to 50,000 in the presence of a tertiary amine with either a N-substituted pyrrole alone, or a mixture of a N-substituted pyrrole with an additional compound which is reactive with the poly(dichlorophosphazene) to form a copolymer having at least two different substitution groups on the backbone of the polyphosphazene. When the N-substituted pyrrole alone is reacted, it is used to partially substitute the polydichlorophosphazene leaving chlorine atoms on the polyphosphazene which can either remain or be substantially replaced by further reaction with additional compounds. Examples of the additional compounds used to form copolymers are illustrated in the section entitled "Additional Reactive Compounds" below.

I. The Poly(dichlorophosphazene) Polymer

Poly(dichlorophosphazene) polymers which are employed as starting materials in the process of this invention are well known in the art as illustrated in U.S. Pat. Nos. 3,370,020; 4,005,171; and 4,055,520, and the aforementioned publications of H. R. Allcock, the disclosures of which are incorporated herein by reference.

These polymers have the general formula $-NPCl_2.)_n-$ in which n may range from 20 to 50,000 or more. As described in the aforementioned references, the polymers are in general prepared by the thermal polymerization of cyclic oligomers having the formula $(NPCl_2)_m$, in which m is an integer from 3 to 7, with the cyclic trimer and tetramer often comprising up to 90 percent of the olgiomers and the ratio of trimer to tetramer varying with the method of manufacture.

The specific conditions of temperatures, pressure and time employed in the thermal polymerization of the cyclic oligomers can vary considerably depending on whether or not the polymerization is catalyzed. Thus, temperatures, can range from about 130° C. to about 300° C., pressures can range from a vacuum of less than about $10^{-1}$ Torr to superatmospheric and times can range from 30 minutes to about 48 hours.

A preferred process for preparing the poly(dichlorophosphazene) polymers used in the process of this invention is described in the aforementioned incorporated U.S. Pat. No. 4,005,171.

II. The N-Substituted Pyrrole Compounds Useful in Forming the Polymers of the Invention The N-substituted pyrrole compounds which can be employed in producing the polymers of the present invention have not substitutions on at least one alpha-carbon atom other than hydrogen and are represented by the following structural formula:

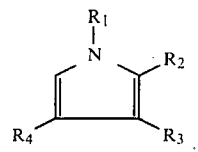

wherein $R_1$ is selected from the group consisting of alkyl and aryl radicals and $R_2$, $R_3$ and $R_4$ are independently selected from the group consisting of hydrogen, alkyl, alkenyl, aryl, alkoxy, aryloxy and heterocyclic radicals; wherein $R_{1-4}$ can themselves be substituted with one or more substituents which are non-reactive with the various materials during polymer formation such as alkyl, aryl, chloro, bromo, nitro, cyano, alkoxy, aryloxy, and heterocyclic groups. It is preferred that when $R_1$ represents an alkyl group containing from one to eight carbon atoms and at least two out of three of $R_{2-4}$ represent hydrogen.

Illustrative examples of N-substituted pyrroles which can be suitably employed in the present invention include: N-methylpyrrole, N-ethylpyrrole, N-propylpyrrole, N-isopropylpyrrole, N-butylpyrrole, N-sec-butylpyrrole, N-hexylpyrrole, N-heptylpyrrole, N-octylpyrrole, N-phenylpyrrole, N-cyclohexylpyrrole and the like.

Illustrative examples of N-substituted pyrroles containing additional substituents include: 1,2-dimethylpyrrole, 1-methyl-2-vinylpyrrole, 1-ethyl-2-methoxymethylpyrrole, 1,4-dimethyl-2-pyrrole, 1-ethyl-2-methoxymethylpyrrole, 1-methyl-2-phenylpyrrole, 1-methyl-2-(4-chlorophenyl)-pyrrole, 1-methyl-2-(4-methoxyphenyl)pyrrole, 1-ethyl-2-(4-cyanophenyl)pyrrole, 1-propyl-2-(4-nitrophenyl)pyrrole, 1-trichloromethylpyrrole, 1-phenyl-2,3,4-trimethylpyrrole, 1-pentachlorophenylpyrrole, and the like.

The preferred N-substituted pyrrole for use in the present invention is N-methyl-pyrrole.

III. Additional Reactive Compounds

As indicated heretofore, the polyphosphazene copolymers of the invention in addition to the N-substituted pyrrole substituent group can contain chlorine groups or substituted and unsubstituted alkoxy, aryloxy, amino or mercapto groups or mixtures thereof.

Preferred substituent groups represented by X′ for use in these copolymers are alkoxy groups, aryloxy groups, amino groups, and mercapto groups.

Alkoxy groups (substituted or unsubstituted) are derived from aliphatic alcohols having from 1 to 20 carbon atoms such as methanol, ethanol, propanol, isopropanol, n-butanol, sec-butanol, hexnol, dodecanol, and the like; fluoroalcohols, especially those represented by the formula $X(CF_2)_nCH_2OH$ in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3=-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X′ substituent groups in the copolymer, mixtures of the foregoing alcohols can be employed.

Aryloxy groups (substituted or unsubstituted) are derived from aromatic alcohols include, among others, phenol; alkylphenols such as cresols, xylenols, p-, o-, and m-ethyl and propyl phenols and the like; halogen-substituted phenols such as p-, o-, and m-chloro and bromophenols and di- or tri-halogen substituted phenols and the like; and alkoxy-substituted phenols such as 4-methoxyphenol, 4-(n-butoxy)-phenol and the like. Mixtures of the foregoing aromatic alcohols can also be employed.

Amino groups are derived from any of the amino compounds heretofore employed in the polyphosphazene polymer art. Thus, the amino groups may be derived from aliphatic primary and secondary amines such as methylamine, ethylamine, dimethylamine, ethylmethylamines and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups are derived from any of the other mercaptan compounds heretofore employed in the polyphosphazene polymer art. Thus, for example, the mercaptan compounds described in U.S. Pat. No. 3,974,242 to Lanier et al. (hereby incorporated by reference) may be utilized. Representative of suitable mercaptan compounds as described in the aforementioned patent are methyl mercaptan and its homologs, ethyl, propyl, butyl, aryl and hexyl mercaptan, thiophenol, thionaphthols, benzyl mercaptan, cyclohexyl mercaptan and the like.

IV. The Tertiary Amine

The use of tertiary amines in preparing the polymers of the invention minimizes undesirable side reactions and at the same time acts as an effective acid scavenger.

Tertiary amines which can be employed in preparing the polymers of the invention are those represented by the general structure:

wherein $R_1$, $R_2$, and $R_3$ can each be alkyl containing from 1 to 8 carbon atoms. Thus, for example, the tertiary amine can be a trialkyl amine such as trimethylamine, triethylamine, triisopropylamine, tri-n-propylamine, tri-isobutylamine, tri-n-butylamine, and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethyl ethylene diamine; pyridine; N-methyl morpholine; n-methyl pyrrole; 1,4-diaza-bicyclo(2.2.2)octane (DABCO); and dipiperidyl ethane.

As indicated above, the polymers of the present invention are prepared by reacting the poly(dichlorophosphazene) polymer and the N-substituted pyrroles in the presence of a tertiary amine to first partially substitute the polyphosphazene or in combination with the compounds listed in the group of "Additional Reactive Compounds," which also can be substituted onto the poly(dichlorophosphazene) in the presence of a tertiary amine and which can be employed in the reaction mix.

The specific reaction conditions and proportion of ingredients employed in preparing these polymers can vary somewhat depending of factors such as the reactivity of the specific N-substituted pyrrole compound and the copolymer substituent utilized, the particular tertiary amine employed, and degree of substitution desired in the finished polymer. In general, reaction temperature can range from about 25° C. to about 200° C. and times can range from 3 hours to 7 days; lower temperatures necessitating longer reaction times and higher temperatures allowing shorter reaction times. These conditions are, of course, utilized in order to obtain the most complete reaction possible, i.e., to insure the substantial conversion of the chlorine atom in the polymer to the corresponding substituted pyrrole compounds and form a substantially hydrolytically stable polymer.

The above reaction is ordinarilly carried out in the presence of a solvent or a mixture of solvents. The solvent employed in the reaction should be a solvent for the poly(dichlorophosphazene) polymer, the N-substituted pyrrole and the tertiary amine. Examples of suitable solvents which may be employed include diglyme, triglyme, tetraglyme, cyclohexane, chloroform, dioxane, dioxolane, methylene chloride, toluene, xylene, and tetrahydrofuran. The amount of solvent is not critical and any amount sufficient to solubilize the reaction mixture materials can be employed. In addition the materials in the reaction zone should be reasonably free of water. The prevention of substantial amount of water in the reaction system is necessary in order to inhibit the undesirable side reaction of the available chlorine atoms in the chloropolymer. Preferably, the reaction mixture should contain less than about 0.01 percent water.

In general, the amount of N-substituted pyrrole and if present, the other compounds which are substitutionally reactive with poly(dichlorophosphazene) employed in the process should be at least molecularly equivalent to the number of available chlorine atoms in the starting polymer. However, if desired, an excess of such compounds may be employed in order to insure substantially complete reaction of all the available chlorine atoms.

While the N-substituted pyrrole-substituted poly(phosphazene) copolymers of the present invention have been prepared in the above-identified manner, that is, in the presence of a tertiary amine, alternative methods of preparation are available for preparation of the copolymer.

The prior art methods of poly(dichlorophosphazene) substitution such as by reaction with sodium alkoxide as demonstrated in U.S. Pat. No. 3,370,020 to Allcock et al. cannot be used to substitute the N-substituted pyrrole substituents of the phosphazene polymers of the present invention.

The prior art methods may be used to partially substitute the poly(dichlorophosphazene) with the substituents derived from the compounds listed in the list of additional reactive compounds. The remaining chlorines on the partially substituted poly(dichlorophosphazene) are then replaced with N-substituted pyrrole groups using the tertiary amine substitution process thereby forming a copolymer. Of course, the N-substituted pyrrole can be the first substituents substituted.

The following example is submitted for the purpose of further illustrating the nature of the present invention and is not intended as a limitation on the scope thereof. Parts and percentages referred to in the example and throughout the specification are by weight unless otherwise indicated. All temperatures are degrees of Centigrade unless otherwise specified.

EXAMPLE 1

A 10-ounce bottle was charged with 3.90 cc (3.57 gms, 44 millimoles) of N-methylpyrrole, 12.3 cc (88 millimoles) of triethylamine, 100 cc of tetrahydrofuran (hereinafter THF) and 52.3 gms (39.8 millimoles) of an 8.83% THF solution of poly(dichlorophosphazene). The bottle containing the reactants was heated for 20 hours at 80° C. upon which a slight amount of insoluble triethylamine hydrochloride was formed and the solution turned red. The bottle and its contents were heated at 80° C. for an additional 68 hours whereupon the large solid layer of salt and polymer in the bottom of the bottle was subjected to Infrared spectroscopy and no phosphazene bands could be detected. An additional charge of 6.4 cc (88 millimoles) of 1,1,1-trifluoroethanol was added to the bottle which was then heated for 20 hours at 80° C. The material in the bottle was then coagulated in methanol to yield 5.7 gms of a red rubbery polymer having a $T_g$ of $-68°$ C. and a $T_m$ of 117° C.

EXAMPLE 2

A 10-ounce bottle was charged with 3.90 cc (44 millimoles) of N-methylpyrrole, 100 cc of THF, 12.3 cc (88 millimoles) of triethylamine, 33.08 g (40 millimoles) of a 14% solution of poly(dichlorophosphazene) in cyclohexane. The mixture in the bottle which very slowly became cloudy was heated for 20 hours at 120° C. whereupon a large white precipitate was formed. 4.43 cc (44 millimoles) of parachlorophenol was added to the contents of the bottle which was then additionally heated for 20 hours at 120° C. The reaction product in the bottle was then filtered and water washed to yield 6.53 gms of a red powder. The red powder was pressed at 110° C. to form a clear pink film. Infrared spectroscopy of the film showed the absence of a P—Cl band at 600 cm$^{-1}$.

We claim:

1. A polyphosphazene copolymer containing units represented by the formulas:

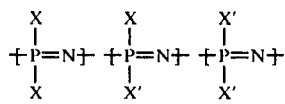

wherein X is the same or mixtures of different radicals represented by:

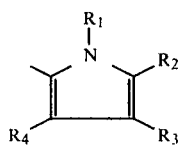

wherein $R_1$ is selected from the group consisting of substituted and unsubstituted alkyl and aryl radicals and $R_2$, $R_3$ and $R_4$ are selected from the group consisting of hydrogen and substituted and unsubstituted alkyl, alkenyl, aryl, alkoxy, aryloxy, and heterocyclic radicals; and X' is selected from the group consisting of halogen and substituted alkoxy, aryloxy, amino and mercapto radicals and mixtures thereof.

2. The polymer of claim 1 in which X is derived from N-methylpyrrole.

3. The polymer of claim 1 in which X' is selected from the group consisting of —OCH$_2$CF$_3$ and —OC$_6$H$_4$—p—Cl and mixtures thereof.

4. The polymer of claim 1 wherein the units of the polyphosphazene copolymer are randomly distributed.

5. A method of preparing polyphosphazene copolymers containing units represented by the formulas:

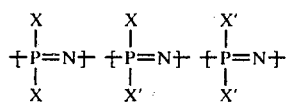

wherein X is the same or mixtures of different radicals represented by:

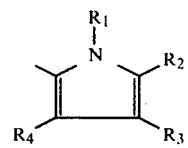

wherein $R_1$ is selected from the group consisting of substituted and unsubstituted alkyl and aryl radicals and $R_2$, $R_3$ and $R_4$ are selected from the group consisting of hydrogen and substituted and unsubstituted alkyl, alkenyl, aryl, alkoxy, aryloxy, and heterocyclic radicals; and X' is selected from the group consisting of halogen and substituted and unsubstituted alkoxy, aryloxy, amino and mercapto radicals and mixtures thereof; said method comprising reacting a poly(dichlorophosphazene) polymer having the formula —(NPCl$_2$)$_n$— wherein n is from 20 to 50,000, with one or more N-substituted pyrrole compounds or a mixture of one or more N-substituted pyrrole compounds and an additional compound or a mixture of additional compounds selected from the group consisting of substituted and unsubstituted alkanols, aromatic alcohols, amines, mercaptans, and mixtures thereof in the presence of a tertiary amine.

6. The method of claim 5 wherein the N-substituted pyrrole compound is N-methylpyrrole.

7. The method of claim 5 wherein the additional compound is trifluoroethanol.

8. The method of claim 5 wherein the additional compound is p-chlorophenol.

9. The method of claim 5 wherein the tertiary amine is triethylamine.

* * * * *

UNITED STATES PATENT AND TRADEMARK OFFICE
CERTIFICATE OF CORRECTION

PATENT NO. : 4,243,795
DATED : January 6, 1981
INVENTOR(S) : William L. Hergenrother and Adel F. Halasa It is certified that error appears in the above-identified patent and that said Letters Patent are hereby corrected as shown below:

Column 2, line 67

"usually" should read -- usefully --

Column 3, line 46

"olgiomers" should read -- oligomers -- column 3, line 66

"not" should read -- no --

Signed and Sealed this

Fourteenth Day of April 1981

[SEAL]

Attest:

RENE D. TEGTMEYER

Attesting Officer          Acting Commissioner of Patents and Trademarks